United States Patent
Kambara et al.

(10) Patent No.: US 8,696,943 B2
(45) Date of Patent: Apr. 15, 2014

(54) CARBON NANOFIBER, PRODUCING METHOD AND USE OF THE SAME

(75) Inventors: Eiji Kambara, Kawasaki (JP); Akihiro Kitazaki, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 580 days.

(21) Appl. No.: 12/997,534

(22) PCT Filed: Jun. 16, 2009

(86) PCT No.: PCT/JP2009/002727
§ 371 (c)(1),
(2), (4) Date: Dec. 10, 2010

(87) PCT Pub. No.: WO2009/153970
PCT Pub. Date: Dec. 23, 2009

(65) Prior Publication Data
US 2011/0101265 A1    May 5, 2011

Related U.S. Application Data

(60) Provisional application No. 61/075,203, filed on Jun. 24, 2008.

(30) Foreign Application Priority Data

Jun. 18, 2008   (JP) .................. 2008-159790

(51) Int. Cl.
*H01B 1/04*   (2006.01)
*B01J 23/745*   (2006.01)
*D01F 9/12*   (2006.01)

(52) U.S. Cl.
USPC ........... 252/511; 252/503; 252/507; 252/506; 423/447.3; 502/185; 502/309; 502/312; 502/316

(58) Field of Classification Search
USPC ............... 252/511, 503, 507, 506; 423/447.3; 502/185, 309, 312, 316
See application file for complete search history.

(56) References Cited

U.S. PATENT DOCUMENTS

| | | | |
|---|---|---|---|
| 6,518,218 B1 | 2/2003 | Sun et al. | |
| 7,390,475 B2 * | 6/2008 | Kambara et al. | 423/447.1 |
| 7,771,694 B2 * | 8/2010 | Kambara et al. | 423/447.1 |
| 7,879,261 B2 * | 2/2011 | Oriji et al. | 252/503 |
| 8,308,990 B2 * | 11/2012 | Oriji et al. | 252/503 |
| 8,404,208 B2 * | 3/2013 | Kambara et al. | 423/447.3 |
| 2005/0104044 A1 * | 5/2005 | Kambara et al. | 252/500 |
| 2006/0188717 A1 * | 8/2006 | Kambara et al. | 428/367 |
| 2008/0176070 A1 | 7/2008 | Kitazaki et al. | |
| 2009/0008611 A1 * | 1/2009 | Oriji et al. | 252/511 |
| 2009/0140215 A1 | 6/2009 | Buchholz et al. | |
| 2010/0261062 A1 * | 10/2010 | Kambara et al. | 429/231.8 |
| 2011/0089365 A1 * | 4/2011 | Oriji et al. | 252/73 |
| 2011/0101265 A1 * | 5/2011 | Kambara et al. | 252/74 |
| 2011/0104490 A1 * | 5/2011 | Kambara et al. | 428/368 |
| 2011/0105685 A1 * | 5/2011 | Kambara et al. | 524/611 |
| 2011/0218288 A1 * | 9/2011 | Kambara | 524/495 |
| 2012/0321543 A1 * | 12/2012 | Miyamoto et al. | 423/447.1 |

FOREIGN PATENT DOCUMENTS

| | | | |
|---|---|---|---|
| CN | 1446628 A | | 10/2003 |
| JP | 2004-360099 A | | 12/2004 |
| JP | 3951901 B2 | | 8/2007 |
| KR | 10-0726368 B1 | | 6/2007 |
| WO | WO 2005019511 A1 * | | 3/2005 |
| WO | 2006/050903 A2 | | 5/2006 |
| WO | 2008/075766 A1 | | 6/2008 |

OTHER PUBLICATIONS

Third Party's Observations dated Dec. 13, 2013 in JP Application No. 2008-159790.

* cited by examiner

*Primary Examiner* — Douglas McGinty
(74) *Attorney, Agent, or Firm* — Sughrue Mion, PLLC

(57) ABSTRACT

A catalyst for producing a carbon nanofiber is obtained by dissolving or dispersing [I] a compound containing Fe element; [II] a compound containing Co element; [III] a compound containing at least one element selected from the group consisting of Ti, V, Cr, and Mn; and [IV] a compound containing at least one element selected from the group consisting of W and Mo in a solvent to obtain a solution or the fluid dispersion, and then impregnating a particulate carrier with the solution or the fluid dispersion. A carbon nanofiber is obtained by bringing a carbon element-containing compound into contact with the catalyst in a vapor phase at a temperature of 300 degrees C. to 500 degrees C.

14 Claims, 2 Drawing Sheets

CARBON NANOFIBER, PRODUCING METHOD AND USE OF THE SAME

TECHNICAL FIELD

This International application claims priority under 35 U.S.C. sect. 119(e) on U.S. Provisional Application No. 61/075,203 filed on Jun. 24, 2008 and under 35 U.S.C. sect. 119(a) on Patent Application No. 2008-159790 filed in Japan on Jun. 18, 2008, the entire contents of which are hereby incorporated by reference.

The present invention relates to a carbon nanofiber, a producing method and use of the same.

BACKGROUND ART

It is known that an electrically conductive composite material can be obtained by mixing an electrically conductive filler such as carbon black, carbon fiber, metal powder and the like in a resin material such as thermosetting resin, thermoplastic resin and the like.

However, in order to give high electric conductivity, particularly preferably volume resistivity of $1*10^6$ ohm cm or less, to this type of composite materials, it is necessary to add a considerable amount of conductive filler. The conductive filler added in a large quantity gives a bad influence to the properties of the resin material, and original characteristics of the resin might not be exerted in the prepared composite material.

Thus, a filler is in demand which can, even with a small amount, give sufficient conductivity.

A vapor grown carbon fiber as the conductive filler includes those in a structure in which a graphite layer is inclined to the fiber axis which is referred as fishbone type or herringbone type, those in which a graphite layer is substantially at a right angle to the fiber axis which is referred as platelet type, no-hollow carbon fiber or carbon fiber with an obscure graphite layer. They are called "carbon nanofiber" in general.

On the other hand, there are known that a carbon fiber with the graphite layer is substantially in parallel with the fiber axis which is referred as tube type, and the carbon fiber with such a structure is called "carbon nanotube".

PTL 1 discloses a fishbone-type carbonaceous fine-fibrous body that is carbon nanofiber with excellent kneading performance with a resin and good conductivity. According to PTL 1, it is considered that asperity formed by commissure interval between bone chips on a side peripheral portion of the fibrous body and planar interval between the bone chips give a good influence on conductivity and kneading performance. Moreover, it is disclosed that, as compared with the carbon fiber (carbon nanotube) with an angle (theta) of the graphite layer at substantially 0 degree that is parallel with the fiber axis, the fishbone type carbonaceous fine-fibrous body gives lower volume specific resistance when made into a resin composite material. However, the carbon nanofiber shown in PTL 1 has many residues from a catalyst component when it is calculated from the examples described in the gazette. If there are many impurities in the resin composite material, there is a problem that mechanical properties of the composite material such as strength and the like are extremely lowered because of invitation in decomposition of the resin by the impurities in molding and the like.

As a method for producing carbon nanofiber or carbon nanotube, a method for growing a carbon fiber using a catalyst as a core, namely, a so-called chemical vapor deposition method (hereinafter referred to as CVD method) is known. As the CVD method, a method in which a catalyst metal is supported on a carrier for use and a method in which an organic metal complex or the like is thermally decomposed in a vapor phase so as to generate a catalyst without using a carrier (fluidized vapor phase method) are known.

As the carbon nanofiber obtained by the method of generating a catalyst in a vapor phase (fluidized vapor phase method), PTL 5 shows a carbon fiber having a total metal element content of 0.3 to 0.7% by mass and a transition metal element content of 0.1 to 0.2% by mass obtained by a fluidized vapor phase method in which an organic metal complex such as ferrocene and a carbon source such as benzene are fluidized, and the carbon source is thermally decomposed under a hydrogen atmosphere using a metal particle as a catalyst obtained by thermal decomposition of the metal complex. However, since the fluidized vapor phase method requires a high-temperature reaction field in general, a manufacturing cost is raised. Since the carbon fiber obtained by the fluidized vapor phase method has many defects in a graphite layer and has a problem that without heat treatment at a high temperature for graphitization after the generation of the carbon nanofiber, electric conductivity does not emerge even if being added to a resin or the like as filler. Thus, with the fluidized vapor phase method, it is difficult to inexpensively produce a carbon nanofiber having desired properties.

On the other hand, a method using a catalyst carrier is roughly divided into (1) a method using a platy substrate carrier; and (2) a method of using a particulate carrier. With the method (1) using a platy substrate carrier, since the size of the catalytic metal to be supported can be arbitrarily controlled by applying various film formation technologies, this method is usually used in laboratory demonstration of research. For example, NPL 1 discloses that using those in which an aluminum layer having thickness of 10 nm, an iron layer having thickness of 1 nm, and a molybdenum layer having thickness of 0.2 nm are generated on a silicon substrate can give a tube-like multiwall nanotube or a double-wall nanotube having a fiber diameter of approximately 10 to 20 nm. In order to use the carbon nanotube as filler obtained by this method to be added in a resin or the like, it is necessary to separate it from the substrate and collect it. The carbon nanotube collected as the above substantially contains only catalytic metal component as impurities, but since generation efficiency of the carbon nanotube with respect to a catalyst mass is markedly low, the content of the catalytic metal component in the carbon nanotube is likely to be high. Moreover, if this method is to be industrially utilized, since a platy substrate surface area can not be ensured unless a number of substrates are arranged, not only that device efficiency is low but also many processes such as supporting of the catalytic metal on the substrate, synthesis of the carbon nanotube, collection of the carbon nanotube from the substrate and the like are needed, which is not economical, and industrial utilization has not been realized yet.

On the other hand, with the method (2) using the particulate carrier, as compared with the method using the substrate carrier, since a specific surface area of the catalyst carrier is larger, not only that the device efficiency is favorable but also a reactor used for various chemical synthesis can be applied, and this method has merits that realizes not only a production method based on batch processing such as the substrate method but also continuous reactions. However, with this method, a catalyst carrier is un-avoidably mixed in a carbon nanofiber or a carbon nanotube, and it is difficult to obtain a carbon nanofiber or a carbon nanotube with high purity.

As a method for reducing the amount of impurities in the carbon nanofiber or the carbon nanotube, (1) a method of heat treatment at a high temperature; and (2) a method of washing and removing with acid or base are known, but both of the methods have complicated processes and are not economical. Particularly, in the washing and removing of the impurities with acid or base, since the catalyst carrier and the catalytic metal in the carbon nanofiber or the carbon nanotube are covered by a carbon overcoat in many cases, it is difficult to fully remove the impurities unless the carbon overcoat is removed by using an oxidizing acid such as nitric acid or by performing partial oxidation. If an oxidizing acid is used, not only the carbon overcoat on the surface of the carrier or the catalyst but also the carbon nanotube itself might be damaged and might become defective. The carbon fiber affected by an acid might have lowered electric conductivity or lowered heat conductivity, or dispersibility or filling performance into a resin or the like might be deteriorated.

PTL 3 discloses a catalyst obtained by coprecipitation of a metal having fibril-forming catalytic properties composed of Fe or a combination of Fe and Mo and a carrier metal component such as Al, Mg and the like. It is disclosed that using this catalyst, a carbon fiber having the content of impurities from the catalytic metal of 1.1% by mass or less and the content of the impurities from the catalyst carrier of 5% by mass or less can be obtained. However, catalyst manufacture by coprecipitation is known to have low efficiency and high cost.

PTL 2 discloses a catalyst containing Fe element and at least one element selected from the group consisting of V, Nb, Ta, Cr, Mo, W, Mn, Tc, and Re. Specifically, PTL 2 discloses that the catalyst is obtained by supporting a metal element composed of a combination of Fe and Mo, Fe and Cr, Fe and Ce, Fe and Mn or the like on a carrier using the impregnating method. However, since the obtained carbon fiber has a high impurity content, when it is used as filler to a resin, there is a problem that strength of the resin is lowered.

PTL 4 discloses a supported catalyst obtained by coprecipitation of a catalytic metal component composed of a combination of Mn, Co, and Mo or a combination of Mn and Co and a carrier metal component such as Al, Mg and the like.

CITATION LIST

Patent Literature

[PTL 1] Japanese Patent Laid-Open No. 2004-360099
[PTL 2] U.S. Pat. No. 5,707,916
[PTL 3] Japanese Patent Laid-Open No. 2003-205239
[PTL 4] International Publication No. WO2006-50903
[PTL 5] Japanese Patent Laid-Open No. 2001-80913

Non Patent Literature

[NPL 1] Chemical Physics Letters, 374 (2003) 222-228

SUMMARY OF INVENTION

Technical Problem

The inventors have tried to obtain a carbon fiber using catalysts specifically described in PTLs 2 to 5, but with the methods shown in PTLs 2 to 5, only a tubular carbon nanotube can be obtained, and moreover, the methods in PTL 2 and PTL 5 have complicated manufacturing processes and high costs of facilities. The carbon nanotube obtained by the method of PTL 3 has a high impurity content, and it is known that even by using the carbon nanotube as filler obtained by the method in PTL 4, an effect to give conductivity is not sufficient.

As mentioned above, it has been difficult to obtain a carbon nanofiber with a low cost that can give high heat conductivity and high electric conductivity when being used as filler and has low impurity content.

The present invention has an object to provide a catalyst that can efficiently produce a carbon nanofiber with less impurity, and to provide a carbon nanofiber that is excellent in filling performance and dispersibility to a resin or the like and has a good effect to give electric conductivity and heat conductivity.

Solution to Problem

As the result of keen researches by the inventors in order to solve the above problems, they have found out that by conducting a vapor phase growth reaction of carbon at a low temperature at 500 degrees C. or less, using a catalyst for producing carbon nanofiber obtained by dissolving or dispersing [I] a compound containing Fe element; [II] a compound containing Co element; [III] a compound containing at least one element selected from the group consisting of Ti, V, Cr, and Mn; and [IV] a compound containing at least one element selected from the group consisting of W and Mo in a solvent to obtain a solution or fluid dispersion and impregnating a particulate carrier with the solution or the fluid dispersion, a carbon nanofiber suitable as conductive filler can be obtained. The present invention was completed as the result of further researches based on these findings.

That is, the present invention includes the following modes.

(1) A carbon nanofiber containing [I] Fe element; [II] Co element; [III] at least one element selected from the group consisting of Ti, V, Cr, and Mn; and [IV] at least one element selected from the group consisting of W and Mo, and in which a graphite layer is inclined to a fiber axis.

(2) The carbon nanofiber described in (1), in which the total content of the metal elements is 10% by mass or less.

(3) The carbon nanofiber described in (1) or (2), in which the total content of the element [I] and the element [II] is 3% by mass or less, and the each content of the element [III] and the element [IV] (excluding the metal element derived from the carrier) is 0.5% by mass or less.

(4) The carbon nanofiber described in any one of (1) to (3), in which a mass ratio of the element [I] and the element [II] is 10:1 to 1:10.

(5) The carbon nanofiber described in any one of (1) to (4), in which the total content of the element [I], the element [II], the element [III] and the element [IV] (excluding the metal element derived from the carrier) is 4% by mass or less.

(6) A catalyst for producing a carbon nanofiber, comprising [I] Fe element; [II] Co element; [III] at least one element selected from the group consisting of Ti, V, Cr, and Mn; and [IV] at least one element selected from the group consisting of W and Mo.

(7) The catalyst for producing a carbon nanofiber described in (6), in which the element [I], the element [II], the element [III], and the element [IV] are supported on a particulate carrier.

(8) The catalyst for producing a carbon nanofiber described in (7), in which the carrier contains Al, Mg, Si, Ti or Ca.

(9) A method for producing a carbon nanofiber, comprising a step of bringing a carbon element-containing compound into contact with the catalyst for producing a carbon nanofiber described in any one of (6) to (8) in a vapor phase at a temperature of 300 to 500 degrees C.

(10) The method for producing a carbon nanofiber described in (9), further comprising a step of bringing the catalyst into contact with a reducing gas before the step of bringing the catalyst into contact with the carbon element-containing compound.

(11) A carbon nanofiber obtained by the producing method described in (9) or (10).

(12) A composite material comprising the carbon nanofiber described in any one of (1) to (5) and a resin.

(13) A vessel for an electric or electronic component comprising the composite material described in (12).

(14) An electrically conductive slide member comprising the composite material described in (12).

(15) An electrically conductive and thermally conductive member comprising the composite material described in (12).

ADVANTAGEOUS EFFECTS OF INVENTION

According to the present invention, a carbon nanofiber suitable as electric conductive filler for resin can be obtained. Since the carbon nanofiber in the present invention can give high electric conductivity and high heat conductivity with an added amount smaller than in the past, an electrically conductive or thermally conductive resin composite material with a smaller amount of impurity metal element can be obtained inexpensively. Moreover, as compared with the carbon nanotube, the carbon nanofiber in the present invention has high surface activity, and it is also suitable as a catalyst carrier such as a fuel cell and the like or an adsorption agent for methane gas, hydrogen gas and the like.

DESCRIPTION OF EMBODIMENTS

Figure 1:
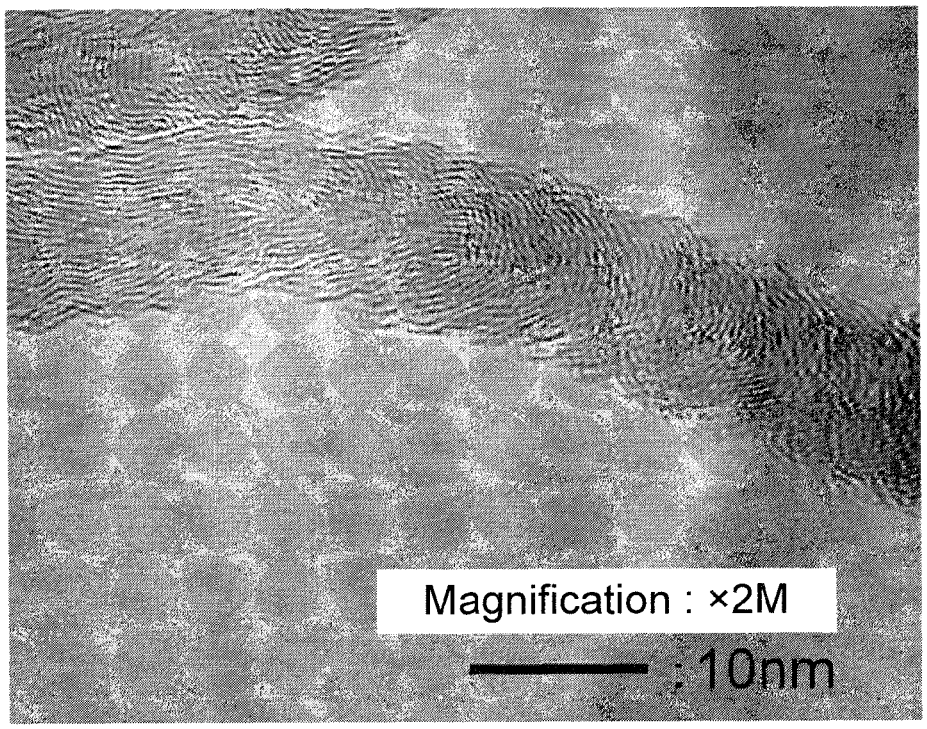
[FIG. 1] a view illustrating an image observed by transmission electron microscope of a product material obtained in Example 1.

The carbon nanofiber in the present invention contains an element [I], an element [II], an element [III], and an element [IV]. The carbon nanofiber containing these four types of elements in combination can be uniformly dispersed when being filled in a resin or the like and give high heat conductivity and high electric conductivity. Also, it does not cause strength deterioration of a composite material obtained by adding the carbon nanofiber.

The element [I], the element [II], the element [III], and the element [IV] are elements derived from the catalytic metal used for production of the carbon nanofiber. If the catalytic metal is supported by the particulate carrier, the metal elements derived from the carrier might be contained in the carbon nanofiber. Some of the carriers contain the element [I], the element [II], the element [III] or the element [IV], but in the present invention, it is assumed to mean that the element [I], the element [II], the element [III], and the element [IV] are contained as elements derived from the catalytic metal, specifically, substances supported by the carrier, excluding the metal elements derived from the carrier.

The element [I] is Fe, and the element [II] is Co.

The element [III] is at least one element selected from the group consisting of Ti, V, Cr, and Mn. Among the elements [III], at least one element selected from the group consisting of Ti, V, and Cr is preferable, at least one element selected from the group consisting of Ti and V is more preferable, and V is particularly preferable.

The element [IV] is at least one element selected from the group consisting of W and Mo.

Combinations of the element [I], the element [II], the element [III] and the element [IV] contained in the carbon nanofiber include Fe—Co—Ti—Mo, Fe—Co—Cr—Mo, Fe—Co—Mn—Mo, Fe—Co—V—Mo, Fe—Co—Ti—W, Fe—Co—V—W, Fe—Co—Cr—W, and Fe—Co—Mn—W.

The carbon nanofiber in the present invention is preferably 3% by mass or less, more preferably 2% by mass or less, or particularly preferably 1% by mass or less in the total content of the element [I] and the element [II]. The carbon nanofiber in the present invention is preferably 0.5% by mass or less, more preferably 0.4% by mass or less, or particularly preferably 0.3% by mass or less in the content of the element [III]. The carbon nanofiber in the present invention is preferably 0.5% by mass or less, more preferably 0.3% by mass or less, or particularly preferably 0.2% by mass or less in the content of the element [IV]. A mass ratio of the element [I] and the element [II] is preferably 10:1 to 1:10, more preferably 7:3 to 1:4, or particularly preferably 1:1 to 1:4.

The preferable content of the element [III] in the carbon nanofiber is different depending on the element species. If the element [III] contained in the carbon nanofiber is Mn, the preferable content of the element [III] with respect to the total content of the element [I] and the element [II] is 1 to 100% by mol, more preferably 5 to 50% by mol, or particularly preferably 20 to 50% by mol. If the element [III] contained in the carbon nanofiber is Ti, V or Cr (excluding the metal element derived from the carrier), the preferable content of the element [III] with respect to the total content of the element [I] and the element [II] is preferably 1 to 100% by mol, more preferably 5 to 50% by mol, or particularly preferably 5 to 20% by mol. The content of the element [IV] in the carbon nanofiber with respect to the total content of the element [I] and the element [II] is preferably 1 to 100% by mol, more preferably 5 to 50% by mol, or particularly preferably 5 to 20% by mol.

The carbon nanofiber in the present invention may contain the metal elements derived from the carrier other than the element [I], the element [II], the element [III] and the element [IV]. For example, they include Al derived from alumina or the like, Mg derived from magnesia or the like, Ca derived from calcium carbonate, calcium hydroxide and the like, Si derived from silica, diatomite and the like, and Ti derived from titanium oxide, silica titania and the like.

The content of the metal element derived from the carrier is preferably 0.1 to 100 times, or more preferably 0.5 to 10 times with respect to the total mass of the element [I], the element [II], the element [III] and the element [IV]. The content of the metal element derived from the carrier in the carbon nanofiber is preferably 5% by mass or less, more preferably 4% by mass or less, or particularly preferably 3% by mass or less.

The carbon nanofiber in the present invention has the total metal element content preferably of 10% by mass or less, more preferably of 7% by mass or less, or particularly preferably of 5% by mass or less. Here, the total metal element content is the total amount of the element [I], the element [II], the element [III] and the element [IV] derived from the catalytic metal and the metal element derived from the carrier.

The amount of metal impurities excluding the metal element derived from the carrier that is the total amount of the element [I], the element [II], the element [III] and the element [IV] in the carbon nanofiber of the present invention is preferably 4% by mass or less, more preferably 3% by mass or less, or particularly preferably 2% by mass or less.

The carbon nanofiber in the present invention preferably does not contain metal elements other than the element [I], element [II], element [III], element [IV], and the metal element derived from the carrier.

The amount of these metal elements in the carbon nanofiber can be determined by measuring the solution obtained by sulfuric nitric acid decomposition of the carbon nanofiber using ICP-AES (Inductively Coupled Plasma-Atomic Emission Spectrometry).

The carbon nanofiber in a preferred embodiment of the present invention has a graphite layer inclined with respect to the fiber axis. An angle theta formed by the fiber axis and the graphite layer is measured from an image observed by a transmission electron microscope (TEM). The angle theta is not particularly limited, but it is preferably 10 degrees or more and 90 degrees or less, more preferably 15 degrees or more and 90 degrees or less, or still more preferably 20 degrees or more and 50 degrees or less.

The graphite layer does not necessarily have to be straight when being observed by a transmission electron microscope and it may be corrugated, curved or discontinuous. If the graphite layer is in a straight, the angle theta can be determined by an angle formed by a straight portion of the graphite layer and the fiber axis. If the graphite layer is corrugated, curved or discontinuous, an approximate line of the graphite layer is drawn in the vicinity of the fiber surface so that the angle theta is determined by an angle formed by the approximate line and the fiber axis.

The carbon nanofiber in which the graphite layer is inclined with respect to the fiber axis has a larger amount of fine asperities on the fiber surface as compared with the carbon nanotube in which the angle theta formed by the fiber axis and the graphite layer is approximately 0 degree and the fiber surface is substantially parallel with the graphite layer. Thus, if the carbon nanofiber with the graphite layer inclined to the fiber axis is used as filler, interaction with a resin is enhanced, by which the dispersibility is improved, and interface strength with the resin is improved. As the result, even if an added amount to the resin is small, improvement of characteristics as electrical conductivity and heat conductivity can be expected, which is not only economical but also that an effect to give strength to the resin composite material can be expected.

Moreover, since there are many fine asperities on the fiber surface as compared with the carbon nanotube, it is suitable as a carrier of various catalysts including fuel cell and an adsorption agent of various gases such as hydrogen gas, methane gas and the like.

Also, the carbon nanofiber in the present invention may be hollow at the center part of the fiber or may not have a hollow part. The hollow part may be continuous in the longitudinal direction or may be discontinuous.

The carbon nanofiber in the preferred embodiment of the present invention has a fiber diameter preferably of 5 nm or more and 100 nm or less, more preferably of 5 nm or more and 70 nm or less, or particularly preferably of 5 nm or more and 50 nm or less.

The carbon nanofiber in the present invention can be obtained by a producing method comprising a step of bringing a carbon element-containing compound into contact with the catalyst in the present invention, which will be described below, in a vapor phase.

The catalyst for producing a carbon nanofiber in the present invention comprises the element [I], the element [II], the element [III] and the element [IV]. By comprising the four types of elements in combination, a carbon nanofiber with drastically reduced impurities can be obtained with a low cost.

The element [I] is Fe, and the element [II] is Co.

The element [III] is at least one element selected from the group consisting of Ti, V, Cr, and Mn. Among the elements [III], at least one element selected from the group of Ti, V, and Cr is preferable, at least one element selected from the group Ti and V is more preferable, and V is particularly preferable from the viewpoint of the generation efficiency. Since Cr has a plurality of types with different oxidation numbers as divalent, trivalent, and hexavalent and Mn includes oxidation numbers as divalent, tetravalent, and heptavalent, control of the oxidation number in catalyst preparation is required, and a catalyst preparation process might become complicated, but Cr gives higher generation efficiency when a calcium carbonate carrier is used. Ti is stable with the oxidation number of tetravalent, and the above-mentioned special control is not needed and the catalyst performance is stable without using a complicated catalyst preparation method.

The element [IV] is at least one element selected from the group consisting of W and Mo.

The catalyst for producing a carbon nanofiber in the present invention has a mass ratio between the element [I]:the element [II] preferably of 10:1 to 1:10, more preferably 7:3 to 1:4, or particularly preferably of 1:1 to 1:4. If the mass ratio between the element [I]:the element [II] is within the above range, the generation efficiency of the carbon nanofiber at a low reaction temperature, preferably at 500 degrees C. or less, becomes high.

A preferable ratio of the element [III] constituting the catalyst is preferably 1 to 100% by mol with respect to the total amount of the element [I] and the element [II]. The preferable ratio of the element [III] constituting the catalyst is different depending on the element species. If the element [III] is Mn, the preferable ratio of the element [III] with respect to the total amount of the element [I] and the element [II] is 1 to 100% by mol, more preferably 5 to 50% by mol, or particularly preferably 20 to 50% by mol. If the element [III] is Ti, V or Cr (excluding the metal element derived from the carrier), the preferable ratio of the element [III] with respect to the total amount of the element [I] and the element [II] is preferably 1 to 100% by mol, more preferably 5 to 50% by mol, or particularly preferably 5 to 20% by mol.

The ratio of the element [IV] constituting the catalyst is preferably 1 to 100% by mol, more preferably 5 to 50% by mol, or particularly preferably 5 to 20% by mol with respect to the total amount of the element [I] and the element [II].

The catalyst for producing carbon nanofiber in the present invention can be obtained by spraying a liquid containing a catalytic metal element into a heated vapor phase, for example. The catalyst obtained by spraying into the heated vapor phase is used in the fluidized vapor phase method.

Also, the catalyst for producing carbon nanofiber in the present invention can be obtained by impregnating a carrier with a liquid containing the catalytic metal element and drying it. In the present invention, a platy substrate catalyst obtained by film-forming of a catalytic metal on a platy substrate carrier can be used, but the platy substrate catalyst is low in productivity and is not suitable for industrial production of the carbon nanofiber. In the present invention, a particulate supported catalyst obtained by having the liquid containing the catalytic metal element by the particulate carrier is preferable from the viewpoint of productivity.

It is only necessary that the particulate carrier is stable in a heating temperature range, and inorganic oxides and inorganic salts are usually used. As specific examples, alumina, zirconia, titania, magnesia, calcium carbonate, calcium hydroxide, calcium oxide, strontium oxide, barium oxide, zinc oxide, strontium carbonate, barium carbonate, silica, silica titania, silica alumina, diatomite, zeolite and the like can be cited. Among them, those containing Al, Mg, Si, Ti or Ca is preferable, or more specifically, alumina, magnesia, titania, calcium carbonate, calcium hydroxide, calcium oxide or silica titania is preferable.

The total supported amount of the element [I], the element [II], the element [III] and the element [IV] is preferably 1 to 200% by mass, more preferably 5 to 100% by mass, or particularly preferably 5 to 70% by mass with respect to the amount of the carrier. If the supported amount is too large, a manufacturing cost rises and the total content of the metal element in the carbon nanofiber tend to be high.

The catalyst for producing carbon nanofiber in the present invention is not particularly limited by its preparation method.

For example, there can be a method of obtaining a catalyst by impregnating the carrier with a liquid containing a catalytic metal element (impregnating method); a method of dispersing the particulate carrier in the liquid containing the catalytic metal element and having a compound containing the catalytic metal element from within the liquid supported on the particulate carrier; a method of holding in a vapor phase using chemical or physical interaction such as adsorption, fixation and the like of a gas containing the catalytic metal element on the particulate carrier; and a method of obtaining a supported catalyst by being precipitated from a liquid containing the catalytic metal element and a solution in which an element constituting the particulate carrier is dissolved substantially at the same time (coprecipitation). Among them, the impregnating method is preferable.

In the impregnating method, [I] a compound containing Fe element; [II] a compound containing Co element; [III] a compound containing at least one element selected from the group consisting of Ti, V, Cr, and Mn; and [IV] a compound containing at least one element selected from the group consisting of W and Mo are dissolved or dispersed in a solvent to obtain a solution or a fluid dispersion, and a particulate carrier is impregnated with the solution or the fluid dispersion and then, dried so as to obtain the catalyst for producing the carbon nanofiber in the present invention.

The catalytic metal elements may be supported on the carrier by impregnating the carrier with a liquid containing all of the compound [I], the compound [II], the compound [III] and the compound [IV]; or may be supported on the carrier by impregnating the particulate carrier with a liquid containing the compound [I], a liquid containing the compound [II], a liquid containing the compound [III], and a liquid containing the compound [IV] in random order.

The liquid containing the catalytic metal element may be a liquid organic compound containing a catalytic metal element or may be a liquid that a compound containing the catalytic metal element dissolved or dispersed in an organic solvent or water. In order to improve dispersibility of the catalytic metal element, a dispersing agent or surfactant (preferably cationic surfactant or anionic surfactant) may be added to the liquid containing the catalytic metal element. A catalytic metal element concentration in the liquid containing the catalytic metal element can be selected as appropriate according to the solvent and catalytic metal species. The amount of the liquid containing the catalytic metal element to be mixed with the carrier preferably corresponds to the liquid absorbing amount of the carrier to be used.

Drying is preferably carried out at 70 to 150 degrees C., after the liquid containing the catalytic metal element and the carrier are sufficiently mixed. Vacuum drying may be used in the drying. Moreover, pulverization and classification are preferably performed after the drying in order to obtain an appropriate size.

A size of the catalytic metal particle is preferably 5 to 100 nm, more preferably 5 to 50 nm, or particularly preferably 10 to 40 nm. The size of the catalytic metal particle can be controlled by adjusting a catalytic precursor species used in catalyst preparation, catalyst preparation method, catalyst carrier, reduction treatment conditions, which will be described later, and the like.

(Carbon Element-Containing Compound)

The carbon element-containing compound used in the method for producing carbon nanofiber in the present invention is not particularly limited. As the carbon element-containing compound, $CCl_4$, $CHCl_3$, $CH_2Cl_2$, $CH_3Cl$, $CO$, $CO_2$, $CS_2$ and the like as well as organic compounds in general are available. Also, the carbon element-containing compound which contains an element such as nitrogen, phosphor, oxygen, sulfur, fluorine, chlorine, bromine, iodine and the like may be used. A carbon element-containing compound with particularly high usability includes carbon monoxide, carbon dioxide, aliphatic hydrocarbon, and aromatic hydrocarbon.

Specific examples of the preferable carbon element-containing compound include inorganic gases such as carbon monoxide, carbon dioxide and the like; alkanes such as methane, ethane, propane, butane, pentane, hexane, heptane, octane and the like; alkenes such as ethylene, propylene, butadiene and the like; alkynes such as acetylene and the like; monocyclic aromatic hydrocarbons such as benzene, toluene, xylene, styrene and the like; condensed polycyclic compounds such as indene, naphthaline, anthracene, phenanthrene and the like; cycloparaffins such as cyclopropane, cyclopentane, cyclohexane and the like; cycloolefins such as cyclopentene, cyclohexene, cyclopentadiene, dicyclopentadiene and the like; condensed alicyclic hydrocarbon compounds such as steroid and the like.

Moreover, derivatives in which oxygen, nitrogen, sulfur, phosphor, halogen and the like are contained in these hydrocarbons, namely, alcohols such as methanol, ethanol, propanol, butanol and the like, oxygen-containing compounds such as ketone, aldehyde, ether and the like; sulfur-containing aliphatic compounds such as methyl thiol, methyl ethyl sulfide, dimethyl thioketone and the like; sulfur-containing aromatic compounds such as phenyl thiol, diphenyl sulfide and the like; sulfur-containing heterocyclic compounds or nitrogen-containing heterocyclic compounds such as pyridine, quinoline, benzothiophene, thiophene and the like; hydrocarbon halide such as chloroform, carbon tetrachloride, chloroethane, trichloroethylene and the like; and natural gas, gasoline, lamp oil, heavy oil, creosote oil, kerosene, turpentine oil, camphor oil, pine oil, gear oil, cylinder oil and the like may also be used. It is needless to say that mixtures of them may also be used.

Particularly preferable carbon element-containing compound is carbon monoxide, methane, ethane, propane, butane, ethylene, propylene, butadiene, acetylene, benzene, toluene, xylene and their mixtures.

(Carrier Gas)

In the production of the carbon nanofiber in the present invention, in addition to the carbon element-containing compound, use of a carrier gas is recommended. As the carrier gas, hydrogen, nitrogen, helium, argon, krypton or a mixed gas of them can be used. However, a gas containing an oxygen molecule (that is, oxygen in a molecular state: $O_2$) such as air is not suitable. Therefore, the carrier gas preferably contains 1% by volume or more of hydrogen, more preferably contains 30% by volume or more of hydrogen, or particularly preferably contains 85% by volume or more of hydrogen.

Since the catalytic metal might be in an oxidized state, the catalyst can be reduced by feeding a gas containing a reducing gas before the carbon element-containing compound is fed. A temperature and time at the reduction are determined by the type of the carrier in use, contact efficiency with the reducing gas, the type of reducing gas and the like and can not be categorically determined, but a preferable reduction temperature is 400 degrees C. or less, and a preferable reduction time is 10 minutes to 5 hours. The more preferable reduction temperature is 300 degrees C. or more and 400 degrees C. or less, and the more preferable reduction time is 10 to 60 minutes.

(Feed Amount of Carbon Element-Containing Compound)

The above-mentioned carbon element-containing compound in a liquid or solid state at a room temperature is preferably heated and evaporated and then, fed. A feed amount of the carbon element-containing compound is different depending on a catalyst to be used, the type of the carbon element-containing compound, reaction conditions and can not be categorically determined, but in (carbon element-containing compound gas flow rate)/(carrier gas flow rate+carbon element-containing compound gas flow rate), it is preferably 10 to 90% by volume or more preferably 30 to 70% by volume.

In the present invention, a temperature when the catalyst and the carbon element-containing compound are brought into contact with each other in order to produce the carbon nanofiber is different depending on the carbon element-containing compound to be used or the like, but it is preferably 250 to 650 degrees C., more preferably 300 to 500 degrees C., or particularly preferably 400 to 500 degrees C. If the temperature is too high, the carbon nanotube tends to be generated. If the temperature is too low, the generation efficiency of the carbon nanofiber is lowered, and the amount of impurities tends to be large.

The reason why the carbon nanofiber with low impurity concentration and excellent dispersibility in the resin is generated by the producing method of the present invention is not known yet, but the reason can be assumed as follows:

A structure of the carbon fiber is assumed to be affected by the size and a phase state of the catalytic metal used in the production. Specifically, if the catalytic metal is small and a part or the whole of it is in a liquid phase in a reaction system, the carbon nanotube is likely to be generated. On the other hand, if the catalytic metal is large and the catalytic metal is in a solid phase, it is affected by a crystalline face of the catalytic metal, and the carbon nanofiber as the fishbone type carbon fiber is likely to be generated. If the catalytic metal is large, a thick fiber is generated, and generation of amorphous carbon becomes remarkable, and not only that a generated amount of the carbon nanofiber is small but also the generated carbon nanofiber is poor in dispersibility, and improvement in the characteristics such as electric conductivity when being added to the resin composite material is not remarkable.

On the other hand, the catalyst in the present invention is assumed that a fine catalytic metal particle is generated in the above metal element proportion. By applying a vapor phase growth reaction at a low temperature using the catalyst in the present invention, it becomes possible to keep the catalytic metal in a solid state, and as the result, it is assumed that the generation of the carbon nanotube is restrained, and the carbon nanofiber with low impurity amount and favorable dispersibility is selectively generated with high efficiency.

A reactor used in the present invention is not particularly limited as long as a desired reaction temperature or the like is obtained, and various reactors used in general for chemical reactions can be used. A reaction method is not particularly limited, either, which may be any of batch type, continuous type and the like, but the continuous type is high in device efficiency in many cases, which is preferable.

Examples of the suitably used reactor include vertical type or horizontal type fixed-bed reactor, moving-bed reactor such as rotary kiln, tunnel kiln, spouted-bed reactor, fluidized-bed reactor and the like.

Since the carbon nanofiber in the present invention has sufficient electric conductivity without graphitization by high-temperature heating, the carbon nanofiber can be used as an electrically conductive filler. Also, by graphitization by high-temperature heating, the electric conductivity can be further improved. The graphitization treatment is conducted by heat treatment at 2000 to 3500 degrees C. under an inactive gas atmosphere composed of helium, argon and the like, for example. The heat treatment may be performed at a high temperature of 2000 to 3500 degrees C. from the beginning, or the temperature may be raised in incremental steps. The heat treatment in stepped temperature rise is performed in a first stage of usually 800 to 1500 degrees C. and in a second stage of usually 2000 to 3500 degrees C.

The composite material can be obtained by mixing and kneading the carbon nanofiber in the present invention into a resin. The amount of the carbon nanofiber added to the composite material is preferably 1 to 30% by mass to the resin. If the added amount is less than 1% by mass, the effect of the carbon nanofiber addition can not be fully exerted. On the other hand, if the added amount is high in concentration exceeding 30% by mass, the characteristics of the resin itself can be easily lost.

The resin used in the composite material in the present invention is not particularly limited but thermosetting resin, light-curable resin or thermoplastic resin is preferable.

As the thermosetting resin, polyamide, polyether, polyimide, polysulfone, epoxy resin, unsaturated polyester resin, phenol resin and the like can be used, and as the thermoplastic resin, nylon resin, polyethylene resin, polypropylene resin, polyamide resin, polyester resin, polycarbonate resin, polyarylate resin and the like can be used.

The composite material in the present invention can be suitably used as a molding material to obtain products requiring impact resistance as well as conductivity and antistatic properties, electrically conductive slide member and electrically and thermally conductive member such as vessel for an electric or electronic component, components used in OA equipment, electronic equipment, electrically conductive packaging components, electrically conductive slide members, electrically and thermally conductive members, antistatic packaging components, automobile components to which electrostatic coating is applied and the like. More specifically, the composite material in the present invention can be used as a component for a seamless belt being excellent in durability, heat resistance, surface smoothness as well as stable electric resistance properties used in a photoreceptor, charge belt, transfer belt, fixation belt and the like in an image forming device such as an electronic photocopier, laser printer and the like, for a tray and a cassette being excellent in heat resistance, antistatic properties and the like for machining, cleaning, transfer, storage and the like of a hard disk, a hard disk head, various semiconductor components in a manufacturing, transport or storage process, and for an automobile components for electrostatic coating and a fuel tube for automobile. Since the carbon nanofiber in the present invention contains extremely small metal impurities, if the hard disk, the hard disk head and various semiconductors are transported by the tray and the cassette manufactured by the composite material in the present invention comprising the carbon nanofiber, contamination on them caused by a metal ion or the like becomes extremely rare.

When these products are to be manufactured, a known resin molding method can be used. The molding method includes injection molding, hollow molding, extrusion molding, sheet molding, thermoforming, rotational molding, laminated molding, transfer molding and the like.

The present invention will be illustrated below referring to Examples and Comparative Examples but they are mere illustrations for the sake of explanation, and the present invention is not limited by them at all.

(Reagents)

Compounds used in the following examples are as follows:

Fe: iron (III) nitrate nonahydrate (Special grade reagent made by Junsei Chemical Co., Ltd.)

Co: cobalt (II) nitrate hexahydrate (Special grade reagent made by Junsei Chemical Co., Ltd.)

V: ammonium metavanadate (Special grade reagent made by Kanto Chemical Co., Inc.)

Cr: chromium (III) nitrate nonahydrate (reagent made by Wako Pure Chemical Industries, Ltd.)

Ti: titanium (IV) tetra-butoxide tetramer (reagent made by Wako Pure Chemical Industries, Ltd.)

Mn: manganese (II) nitrate hexahydrate (reagent made by Wako Pure Chemical Industries, Ltd.)

Mo: hexaammonium heptamolybdate tetrahydrate (reagent made by Wako Pure Chemical Industries, Ltd.)

W: ammonium metatungstate hydrate (made by SIGMA-ALDRICH Corp.)

(Concentration of Impurities)

The concentration of impurities was determined using a CCD multi-element simultaneous type ICP emission spectrophotometer (made by Varian Inc.: VISTA-PRO) at high-frequency output of 1200 W and measurement time of 5 seconds.

In a quartz beaker, 0.1 g of carbon fiber was precisely weighed and subjected to sulfuric nitric acid decomposition. After cooling, it was measured off in a volume of 50 ml. This solution was diluted as appropriate, and each element was quantified by ICP-AES (Atomic Emission Spectrometer). Mass ratio of the impurities to the mass of the carbon fiber is shown in Table. The impurities includes the catalyst carrier, the element [I], the element [II], the element [III], and the element [IV] derived from the catalytic metal.

In the table, the "total of metal impurities" refers to the total content of the metal elements; the "subtotal of the catalytic metals" refers to the total content of the element [I], the element [II], the element [III] and the element [IV] derived from the catalytic metal; and "Al", "Mg", "Si", and "Ti" respectively refer to the content of the each metal element derived from the catalyst carrier.

Example 1

In methanol, 0.36 part by mass of iron nitrate nonahydrate and 1.00 part by mass of cobalt (II) nitrate hexahydrate were dissolved. Moreover, 0.05 part by mass of ammonium metavanadate and 0.075 part by mass of hexaammonium heptamolybdate tetrahydrate were added and dissolved so as to obtain a catalyst preparation solution.

The catalyst preparation solution was dripped and mixed with 1 part by mass of gamma-alumina (AKP-G015; made by Sumitomo Chemical Co., Ltd.). After the mixing, it was vacuum-dried at 100 degrees C. for 4 hours. After the drying, it was crushed in a mortar and pestle so as to obtain a catalyst. The catalyst contained 10% by mol of Mo and 10% by mol of V with respect to the total amount of Fe and Co, and 5% by mass of Fe and 20% by mass of Co were supported by the gamma-alumina.

The weighed catalyst was placed on a quartz boat, and the quartz boat was put in a tubular reactor made by quartz and the vessel was sealed. While a nitrogen gas was made to flow in the reactor, the temperature of the reactor was raised from the room temperature to 440 degrees C. for 60 minutes, and the temperature of 440 degrees C. was maintained for 30 minutes.

While the temperature of 440 degrees C. was maintained, a mixed gas of hydrogen gas (25 parts by volume) and ethylene gas (75 parts by volume) was made to flow for 60 minutes in the reactor so as to perform vapor phase growth reaction. Moreover, the mixed gas of hydrogen gas and ethylene gas was switched to a hydrogen gas (100 parts by volume), and the hydrogen gas was made to flow through the reaction vessel for 15 minutes.

Subsequently, the hydrogen gas was switched to a nitrogen gas, and while the nitrogen gas was made to flow in the reactor, the reactor was cooled to the room temperature. After cooling the reactor, the quartz boat was taken out, and a product material was collected. The mass of the product material was 11.4 times as compared with the weighed catalyst mass, and the impurity amount in the obtained carbon nanofiber was low. The result is shown in Table 1. Also, an image observed by a transmission electron microscope of the product material obtained in Example 1 is shown in FIG. 1. Since the graphite layer was corrugated or curved, an approximate line was drawn in the vicinity of the carbon nanofiber surface, and an angle formed by the approximate line and the fiber axis was measured, which was approximately 25 to 41 degrees. Many non-hollow portions were found at the center part of the carbon nanofiber.

Example 2

A catalyst was obtained by the same manner as in Example 1 except that the catalyst preparation recipe was changed to that as shown in Table 1. Using the catalyst, a carbon nanofiber was obtained by the same manner as in Example 1. A carbon nanofiber with low impurity amount was obtained. The result is shown in Table 1. An image observed by the transmission electron microscope of the carbon nanofiber obtained in Example 2 was similar to that in FIG. 1.

Examples 3 to 5

Figure 2:
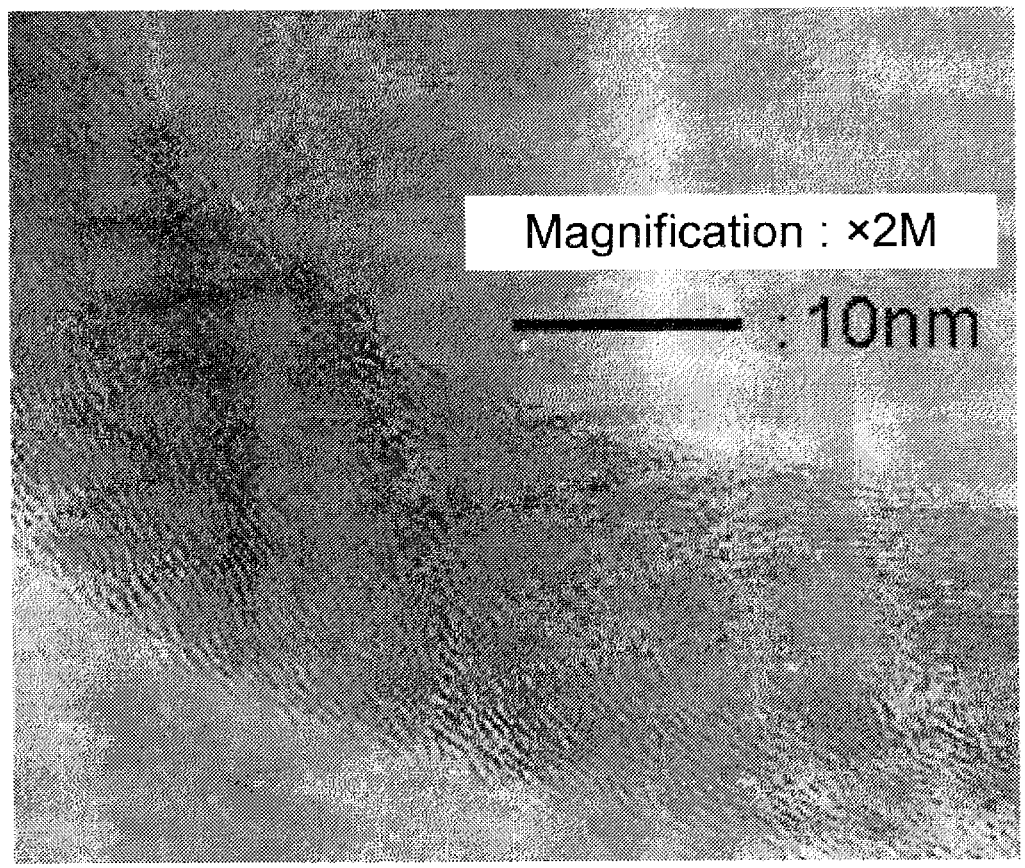
[FIG. 2] a view illustrating an image observed by transmission electron microscope of a product material obtained in Example 3.

A catalyst was obtained by the same manner as in Example 1 except the change to the catalyst preparation recipe as shown in Table 1. A carbon nanofiber with a low impurity amount was obtained. The result is shown in Table 1. An image observed by the transmission electron microscope of the carbon nanofiber obtained in Example 3 was shown in FIG. 2. Images observed by the transmission electron microscope of the carbon nanofiber obtained in Examples 4 and 5 were similar to that in FIG. 2.

Since the graphite layer was corrugated or curved, an approximate line was drawn in the vicinity of the carbon nanofiber surface, and an angle formed by the approximate line and the fiber axis was measured, which was approximately 20 to 35 degrees. Most of the carbon nanofiber had hollow portions.

Comparative Example 1

Figure 3:
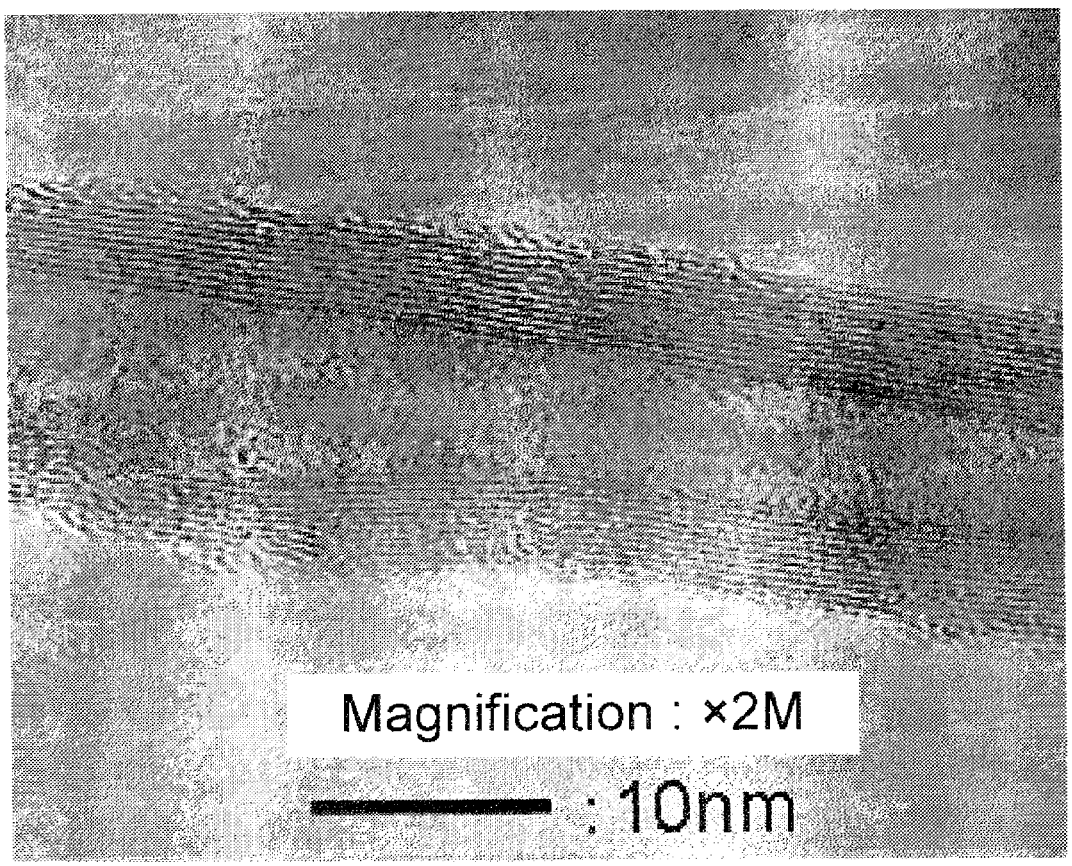
[FIG. 3] a view illustrating an image observed by transmission electron microscope of a product material obtained in Comparative Example 1.

A product material was obtained by the same manner as in Example 4 except that the reaction temperature in the vapor phase growth reaction was changed to 690 degrees C. Though the production material had a small residual impurity amount, it was a carbon nanotube having a graphite layer forming a tube shape substantially in parallel with the fiber axis. An image observed by the transmission electron microscope of the substance generated in Comparative Example 1 is shown in FIG. 3. The result is shown in Table 1.

Comparative Examples 2 to 4

A catalyst was obtained by the same manner as in Example 3 except the change to the catalyst preparation recipe as shown in Table 1. Using the catalyst, a production material was obtained by the same manner as in Example 3. The amount of production was small, and a residual impurity amount was as high as 10% by mass or more. The result is shown in Table 1.

Example 6

A catalyst was obtained by the same recipe as in Example 2. The weighed catalyst was placed on a quartz boat, and the quartz boat was put in a tubular reactor made by quartz and the reactor was sealed. While a nitrogen gas was made to flow in the reactor, the temperature of the reactor was raised from the room temperature to 440 degrees C. for 60 minutes, and the temperature of 440 degrees C. was maintained for 30 minutes.

While the temperature of 440 degrees C. was maintained, a mixed gas of hydrogen gas (80 parts by volume) and nitrogen gas (20 parts by volume) was made to flow for 30 minutes in the reactor so as to perform reduction treatment.

Subsequently, the temperature of 440 degrees C. was maintained, a mixed gas of the hydrogen gas (25 parts by volume) and ethylene gas (75 parts by volume) was made to flow for 60 minutes to carry out a vapor phase growth reaction. Moreover, the mixed gas of the hydrogen gas and the ethylene gas was switched to the hydrogen gas (100 parts by volume), and the hydrogen gas was made to flow in the reaction vessel for 15 minutes.

Next, the hydrogen gas was switched to the nitrogen gas, and while the nitrogen gas was made to flow in the reactor, the reactor was cooled to the room temperature. After cooling the reactor, the quartz boat was taken out, and a production material was collected. The result is shown in Table 2. An image observed by a transmission electron microscope of the generated substance obtained in Example 6 is similar to in FIG. 1.

TABLE 1

|  | Example | | | | | Comp. Ex. | | |
| --- | --- | --- | --- | --- | --- | --- | --- | --- |
|  | 1 | 2 | 3 | 4 | 5 | 2 | 3 | 4 |
| Catalyst preparation proportions (unit: g) | | | | | | | | |
| Iron nitrate nonahydrate | 0.36 | 0.91 | 0.91 | 1.27 | 1.63 | 1.81 | — | 1.81 |
| Cobalt nitrate hexahydrate | 1.00 | 0.62 | 0.62 | 0.37 | 0.13 | — | 1.24 | — |
| Hexaammonium heptamolybdate tetrahydrate | 0.075 | 0.075 | 0.075 | 0.075 | 0.075 | — | — | 0.075 |
| Ammonium metavanadate | 0.05 | 0.05 | 0.05 | 0.05 | 0.05 | — | — | 0.05 |
| Vapor phase growth reaction condition | | | | | | | | |
| Reaction temperature (° C.) | 440 | 440 | 490 | 490 | 490 | 490 | 490 | 490 |
| volume ratio of Ethylene/hydrogen | 75/25 | 50/50 | 50/50 | 50/50 | 50/50 | 50/50 | 50/50 | 50/50 |
| Impurities in production (unit: %) | | | | | | | | |
| Fe | 0.26 | 0.81 | 0.30 | 0.65 | 1.92 | 6.25 | 0.00 | 3.59 |
| Co | 1.05 | 0.81 | 0.30 | 0.28 | 0.22 | 0.00 | 4.34 | 0.00 |
| Mo | 0.21 | 0.26 | 0.10 | 0.15 | 0.35 | 0.00 | 0.00 | 0.58 |
| V | 0.11 | 0.14 | 0.05 | 0.08 | 0.19 | 0.00 | 0.00 | 0.31 |
| Subtotal of catalytic metals | 1.64 | 2.02 | 0.75 | 1.17 | 2.67 | 6.25 | 4.34 | 4.49 |
| Al | 2.75 | 3.42 | 1.27 | 1.97 | 4.51 | 13.20 | 9.15 | 7.58 |
| Total of metal impurities | 4.38 | 5.44 | 2.02 | 3.14 | 7.18 | 19.45 | 13.49 | 12.07 |

Examples 7 to 9

A production material was obtained by the same manner as in Example 6 except the change of the temperature in the reduction treatment to a temperature as shown in Table 2. The result is shown in Table 2. An image observed by the transmission electron microscope of the carbon nanofiber obtained in Examples 7 to 9 were similar to in FIG. 1.

Examples 10 to 12

A catalyst was prepared by the same manner as in Example 4 except that a compound containing the element 4 shown in Table 3 (titanium tetra-butoxide tetramer (10% by mol of Ti with respect to the total of Fe and Co), chromium nitrate nonahydrate (10% by mol of Cr with respect to the total of Fe and Co), and manganese nitrate hexahydrate (40% by mol of Mn with respect to the total of Fe and Co)) were respectively used instead of ammonium metavanadate. And using the catalyst, a carbon nanofiber was obtained by the same manner as in Example 4. Images observed by the transmission electron microscope of the carbon nanofiber obtained in Examples 10 to 12 were similar to in FIG. 1.

Examples 13 to 16

A catalyst was prepared by the same manner as in Examples 4, 10, 11 and 12 except that a compound containing the element 3 (ammonium metatungstate (10% by mol of W with respect to the total of Fe and Co)) was used instead of hexaammonium heptamolybdate tetrahydrate. And using the catalyst, a carbon nanofiber was obtained by the same manner as in Example 4. Images observed by the transmission electron microscope of the carbon nanofiber obtained in Examples 13 to 16 were similar to in FIG. 1.

TABLE 2

| | Example | | | | |
|---|---|---|---|---|---|
| | 2 | 6 | 7 | 8 | 9 |
| Reduction treatment temperature (° C.) | — | 440 | 340 | 300 | 240 |
| Impurities in production (unit: %) | | | | | |
| Fe | 0.81 | 0.66 | 0.52 | 0.51 | 1.24 |
| Co | 0.81 | 0.66 | 0.52 | 0.51 | 1.24 |
| Mo | 0.26 | 0.22 | 0.17 | 0.17 | 0.40 |
| V | 0.14 | 0.12 | 0.09 | 0.09 | 0.22 |
| Subtotal of catalytic metals | 2.02 | 1.66 | 1.30 | 1.28 | 3.10 |
| Al | 3.42 | 2.80 | 2.19 | 2.16 | 5.25 |
| Total of metal impurities | 5.44 | 4.46 | 3.49 | 3.44 | 8.35 |

TABLE 3

| | Example | | | | | | |
|---|---|---|---|---|---|---|---|
| | 10 | 11 | 12 | 13 | 14 | 15 | 16 |
| Catalytic metal element | | | | | | | |
| Element 1 | Fe | Fe | Fe | Fe | Fe | Fe | Fe |
| Element 2 | Co | Co | Co | Co | Co | Co | Co |
| Element 3 | Mo | Mo | Mo | W | W | W | W |
| Element 4 | Ti | Cr | Mn | V | Ti | Cr | Mn |
| Impurities in production (unit: %) | | | | | | | |
| Fe | 0.77 | 0.48 | 0.56 | 0.58 | 0.86 | 0.62 | 0.58 |
| Co | 0.33 | 0.20 | 0.24 | 0.25 | 0.37 | 0.26 | 0.25 |
| Element 3 | 0.18 | 0.11 | 0.13 | 0.25 | 0.38 | 0.27 | 0.26 |
| Element 4 | 0.09 | 0.06 | 0.33 | 0.07 | 0.10 | 0.08 | 0.35 |
| Subtotal of catalytic metals | 1.37 | 0.85 | 1.26 | 1.15 | 1.71 | 1.23 | 1.44 |
| Al | 2.30 | 1.44 | 1.68 | 1.73 | 2.58 | 1.87 | 1.75 |
| Total of metal impurities | 3.67 | 2.29 | 2.94 | 2.88 | 4.29 | 3.10 | 3.19 |

Examples 17 and 18

A catalyst was prepared by the same manner as in Example 4 except that magnesia (made by Ube Material Industries, Ltd., high-purity magnesia ultrafine powder 500A) and silica titania (made by Fuji Silysia Chemical Ltd., silica titania 205 special product) shown in Table 4 were respectively used instead of gamma-alumina. And using the catalyst, a carbon nanofiber was obtained by the same manner as in Example 4. Images observed by the transmission electron microscope of the carbon nanofiber obtained in Examples 17 and 18 were similar to in FIG. 1.

Examples 19 and 20

So as to obtain a composite material, 5 parts by mass of the carbon nanofiber obtained in Examples 1 and 2, and 95 parts by mass of cycloolefin polymer (made by Zeon Corporation, Zeonoa 1420R) were kneaded under conditions of 270 degrees C., 80 rpm, and 10 minutes using a Labo plastomill (made by Toyo Seiki Seisaku-sho Ltd., 30C 150 type). This composite material was hot-pressed under conditions of 280 degrees C., 50 MPa, and 60 seconds so as to manufacture a flat plate of 100 mm*100 mm*20 mm A volume resistance was measured by a four probe method in compliance with JIS-K7194 using a volume resistivity meter (made by Mitsubishi Chemical Corporation, Loresta MCPT-410).

Comparative Example 5

Using the carbon nanotube obtained in Comparative Example 1, a composite material was obtained by the same manner as in Example 19. A volume resistance value of the composite material was measured. The result is shown in Table 5.

TABLE 4

| | Example | |
|---|---|---|
| | 17 | 18 |
| Catalyst carrier | Magnesia | Silica titania |
| Impurities in generated substance (unit: %) | | |
| Fe | 1.02 | 0.99 |
| Co | 0.43 | 0.42 |
| Mo | 0.24 | 0.23 |
| V | 0.13 | 0.12 |
| Subtotal of catalytic metal | 1.82 | 1.76 |
| Mg | 3.49 | 0.00 |
| Si | 0.00 | 2.45 |
| Ti | 0.00 | 0.21 |
| Total of metal impurities | 5.31 | 4.42 |

TABLE 5

| | Example | | Comp. Ex. |
|---|---|---|---|
| | 19 | 20 | 5 |
| Composite material volume specific resistance (Ωcm) | $2.3 \times 10^3$ | $2.4 \times 10^3$ | $1.0 \times 10^7$ |

The invention claimed is:

1. A carbon nanofiber containing [I] Fe element; [II] Co element; [III] at least one element selected from the group consisting of Ti, V, Cr, and Mn; and [IV] at least one element selected from the group consisting of W and Mo, and in which a graphite layer is inclined to a fiber axis.

2. The carbon nanofiber according to the claim 1, wherein the total content of the metal elements is 10% by mass or less.

3. The carbon nanofiber according to claim 1, wherein the total content of the element [I] and the element [II] is 3% by mass or less, and the each content of the element [III] and the element [IV] (excluding the metal element derived from the carrier) is 0.5% by mass or less.

4. The carbon nanofiber according to claim 1, wherein a mass ratio of the element [I] and the element [II] is 10:1 to 1:10.

5. The carbon nanofiber according to claim 1, wherein the total content of the element [I], the element [II], the element [III] and the element [IV] (excluding the metal element derived from the carrier) is 4% by mass or less.

6. A catalyst for producing a carbon nanofiber, comprising [I] Fe element; [II] Co element; [III] at least one element selected from the group consisting of Ti, V, Cr, and Mn; and [IV] at least one element selected from the group consisting of W and Mo.

7. The catalyst for producing a carbon nanofiber according to the claim 6, wherein the element [I], the element [II], the element [III], and the element [IV] are supported on a particulate carrier.

8. The catalyst for producing a carbon nanofiber according to the claim 7, wherein the carrier contains Al, Mg, Si, Ti or Ca.

9. A method for producing a carbon nanofiber, comprising a step of bringing a compound containing a carbon element into contact with the catalyst for producing a carbon nanofiber according to claim 6 in a vapor phase at a temperature of 300 to 500 degrees C.

10. The method for producing a carbon nanofiber according to the claim 9, further comprising a step of bringing the catalyst into contact with a reducing gas before the step of bringing the catalyst into contact with the compound containing a carbon element.

11. A composite material comprising the carbon nanofiber according to claim 1 and a resin.

12. A vessel for an electric or electronic component comprising the composite material according to the claim 11.

13. An electrically conductive slide member comprising the composite material according to the claim 11.

14. An electrically conductive and thermally conductive member comprising the composite material according to the claim 11.

* * * * *